US005938872A

United States Patent [19]

[11] Patent Number: 5,938,872
[45] Date of Patent: Aug. 17, 1999

Chang et al.

[54] METHOD FOR METALLIZING A PHOSPHOR LAYER

[75] Inventors: De-An Chang; Chao-Chi Peng, both of Hsinchu, Taiwan

[73] Assignee: Industrial Technology Research Institute, Hsin-Chu, Taiwan

[21] Appl. No.: 08/788,873

[22] Filed: Jan. 22, 1997

[51] Int. Cl.[6] .............................. C09K 11/00; B05D 5/06

[52] U.S. Cl. ......................... 156/67; 156/276; 156/309.6; 156/324; 427/64; 427/162; 427/226; 427/407.1; 427/404

[58] Field of Search .......................... 156/67, 276, 309.6, 156/324; 427/64, 226, 407.1, 404, 162

[56] References Cited

U.S. PATENT DOCUMENTS

| | | | |
|---|---|---|---|
| 5,145,511 | 9/1992 | Patel et al. | 65/42 |
| 5,256,463 | 10/1993 | Osaka et al. | 156/67 |
| 5,344,353 | 9/1994 | Jang et al. | 445/45 |
| 5,360,630 | 11/1994 | Thomas et al. | 427/67 |
| 5,418,075 | 5/1995 | Utsumi | 428/690 |
| 5,653,830 | 8/1997 | Fleig | 156/67 |

*Primary Examiner*—Janyce Bell
*Attorney, Agent, or Firm*—George O. Saile; Stephen B. Ackerman

[57] ABSTRACT

Two embodiments of a method for metallizing a phosphor layer are presented. The key to the method is covering the phosphor with a temporary planarizing layer onto which the metallizing layer (typically aluminum) is then deposited. Once the metal layer is in place, the planarizing layer is removed (by a burning process), the metal then making good contact with the phosphor and the substrate. In the first embodiment, the dry film is located below the phosphor layer while in the second embodiment it is located above it.

18 Claims, 3 Drawing Sheets

METHOD FOR METALLIZING A PHOSPHOR LAYER

BACKGROUND OF THE INVENTION (1) Field of the Invention

The invention relates to the general field of electroluminescent phosphors, more particularly to methods for metallizing them.

(2) Description of the Prior Art

It is common practice to overcoat phosphor layers, such as those used in cathode ray tubes and similar devices, with a thin layer of a light metal, such as aluminum. Such a layer is both thin enough and light enough so that electrons, coming from the cathode, will pass through it and excite the phosphor to luminescence. Among the functions that such an overcoat may serve we include: (1) acting as an anode for the display (2) neutralizing surface charge that would otherwise build up in the phosphor (3) preventing phosphor contamination (4) improving phosphor efficiency by outward reflection of inwardly directed luminescent light (5) increasing the adhesion of the phosphor to the substrate and (6) preventing or slowing phosphor aging.

There are a number of methods already on record in the prior art for metallizing phosphor layers but few, if any, of them delivers all the above benefits as part of a single process. In particular, it is important that the metal film be deposited onto a surface that is as planar as possible. If this surface is rough, function (4) above cannot be effectively realized and, since the metal film is typically much thinner than the average phosphor particle size (less than 2,000 Angstroms as compared to 4–5 microns), it will lack integrity and contain many pin holes so that functions (3), (5), and (6) above will not be realized either.

The following patents describe methods for metallizing phosphor layers. These methods can be seen to be substantially different from those taught by the present invention.

Patel (U.S. Pat. No. 5,145,511 September 1992) shows a method for metallizing a phosphor layer wherein a novel aqueous filming emulsion with low organic content is used. This film is deposited over a phosphor particle layer prior to the deposition of an aluminum layer.

Utsumi (U.S. Pat. No. 5,418,075 May 1995) first creates a thermal transfer foil by coating a film of polyethylene terephthalate with a stripping layer, an aluminum layer, and a phosphor layer. This is pressed against a glass substrate and heated, thereby transferring the phosphor and the aluminum to the substrate.

Jung (U.S. Pat. No. 5,344,353 September 1994) coats a deposited phosphor layer with a lacquer-like material following which it is subjected to a hardening process. The lacquer is overcoated with a thin layer of aluminum after which the lacquer is left in place. In our experience, lacquers represent a possible source of outgassing and should not be left behind in the completed cathode ray tube.

Thomas et al. (U.S. Pat. No. 5,360,630 November 1994) describes the formation of a phosphor screen at one end of a fiber-optic bundle. The cladding layer is removed from the fiber ends and is replaced with phosphor onto which an aluminum layer is then deposited.

SUMMARY OF THE INVENTION

It has been an object of the present invention to provide a cost effective process for metallizing a phosphor layer.

Another object of the present invention has been to provide a planar surface onto which said metallizing layer gets deposited.

Yet another object of the present invention has been to provide a metallizing layer that has good adhesion to the phosphor layer.

A still further object has been to provide a metallizing layer that protects the phosphor from contamination and reduces it rate of aging.

These objects have been achieved by covering the phosphor with a temporary planarizing layer onto which the metallizing layer (typically aluminum) is then deposited. Once the metal layer is in place, the planarizing layer is removed (by a burning process), the metal then making good contact with the phosphor and the substrate. Two embodiments of the invention are described.

DESCRIPTION OF THE PREFERRED EMBODIMENTS

As discussed earlier, if a metal layer that is deposited onto a phosphor layer is to act as more than just an electrode, it is important that it be deposited onto a planar surface. The present invention has therefore been concerned with providing such a planar surface in a cost effective manner.

Figure 1:
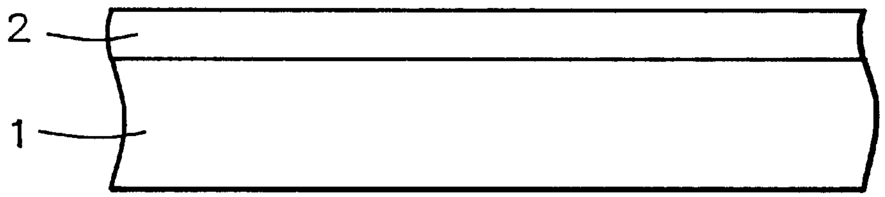
FIGS. 1, 2*a*, 2*b*, 3 and 4 show successive steps in a process representing a first embodiment of the present invention, namely the use of a dry film to provide a planar surface onto which to deposit the metallizing layer.

We refer now to FIG. 1 where we illustrate, in schematic cross-section, the first step of our process, namely the provision of a suitable substrate. We have preferred to use soda lime glass for our substrates but other materials such as Corning 7059 glass or quartz could have been used. In practice the substrate would be the face plate of a cathode ray tube or similar device such as a field emission display.

In a first embodiment of our invention, dry film 2 is deposited onto the surface of substrate 1. For our dry film we have preferred to use Dupont PR 132 and PR 137 but similar products such as Kepro's DFR-4713, 4715, or 4115, or Etertec 5715, 5520, 5510, 5513, or 5515, could also have been used. Corning 7059 glass is an aluminoborosilicate glass having a thermal expansion coefficient of 4.5 ppm/°C. The dry film is typically between about 10 and 25 microns thick and is applied using a laminator or fixer.

Figure 2A:
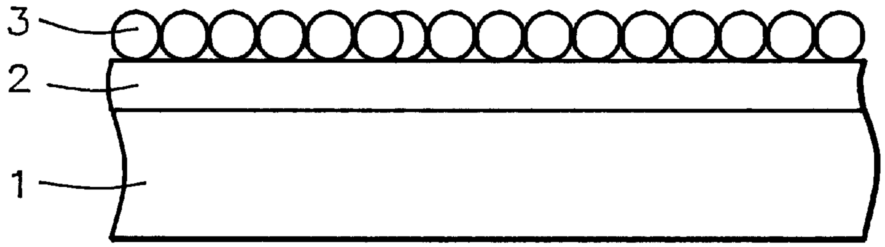
Figure 2B:
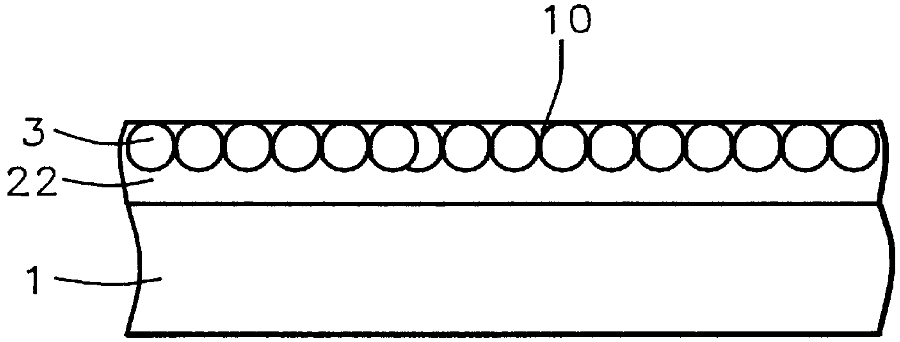

Referring now to FIG. 2*a*, phosphor layer 3 is deposited onto dry film 2 by screen printing or dusting. 'Dry film' is a term used in the industry for photoresist that is applied to a surface as a thin sheet, or film, as opposed to being applied as a liquid which is then allowed to dry. A commonly used formulation for dry film is a three layer laminate of polyethylene, photoresist, and polyethylene teraphthalate. A wide range of different phosphors may be used, including P45, P22, P15, and P1 through P53. This is followed by a heat treatment, typically at between about 100 and 200° C. for between about 10 and 20 minutes in air. Under these conditions the dry film softens (reflows) and phosphor layer 3 sinks down into it. This is illustrated in FIG. 2*b* where phosphor layer 3 is now seen to be embedded within the dry film (now designated as 22) forming a planar upper surface 10.

Figure 3:
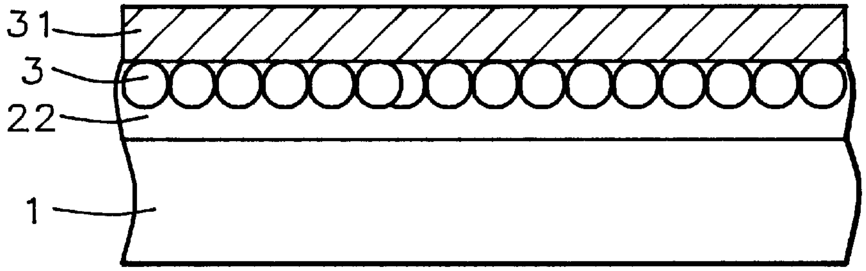

Referring now to FIG. 3, the next step is to deposit metallizing layer 31 onto planar surface 10. Typically, we have used aluminum as the material for layer 31 but other materials, such as gold, copper, titanium, or chromium could also have been used. The thickness of layer 31 is between about 1,500 and 2,500 Angstroms.

Figure 4:
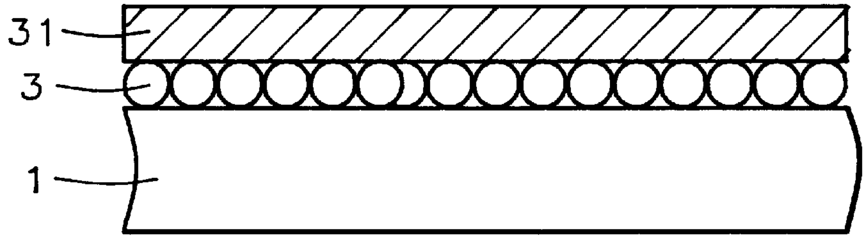

The final step in this first embodiment of our invention is a second heat treatment, typically at between about 450 and 550° C. for between about 60 and 180 minutes in air. This second heat treatment results in the structure seen in FIG. 4 where removal of dry film 22, has caused metal layer 31 to sink down into contact with phosphor layer 3 and phosphor layer 3 to sink down into contact with substrate 1.

Figure 5:
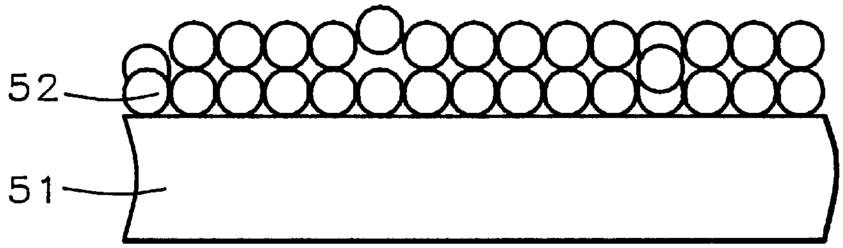
FIGS. 5, 6, 7 and 8 show successive steps in a process representing a second embodiment of the present invention, namely the use of a dry film over the phosphor layer to provide a planar surface onto which to deposit the metallizing layer.

The first step in a process representing a second embodiment of our process is illustrated in FIG. 5. As in the first embodiment, substrate 51 is provided. As material for the substrate we have preferred to use soda lime glass but other materials such as Corning 7059 glass or quartz could have been used. Phosphor layer 52 is then deposited onto substrate 51 by screen printing or dusting. A wide range of different phosphors may be used, including P45, ($Y_2O_2S$ doped with Tb), P22 (a mix of zinc and cadmium sulfides doped with silver, chlorine, aluminum, and indium oxide), and P53 ($Y_3Al_5$ $O_{12}$ doped with Tb).

Figure 6:
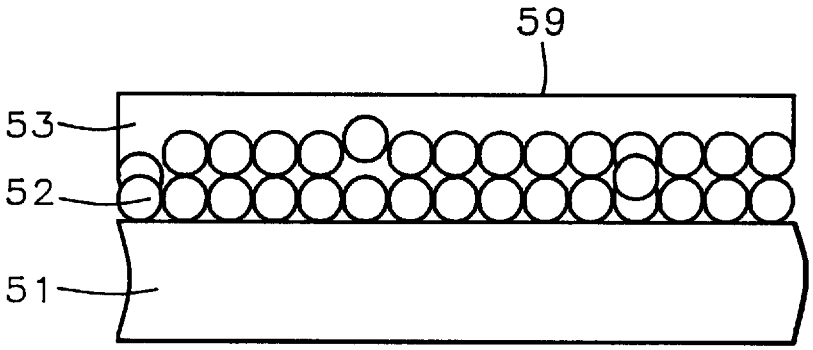

Referring to FIG. 6, the next step is to deposit dry film layer 53 onto the surface of phosphor layer 52. For our dry film we have preferred to use Dupont PR 132 and PR 137 but similar products such as Kepro's DFR-4713, 4715, or 4115, or Etertec 5715, 5520, 5510, 5513, or 5515, could also have been used. The dry film is typically between about 10 and 25 microns thick and is applied using a laminator or fixer.

This is followed by a heat treatment, typically at between about 100 and 200° C. for between about 10 and 20 minutes in air. Under these conditions the dry film softens (reflows) and sinks down into phosphor layer 52, while still retaining a planar upper surface (shown as 59 in FIG. 6).

Figure 7:
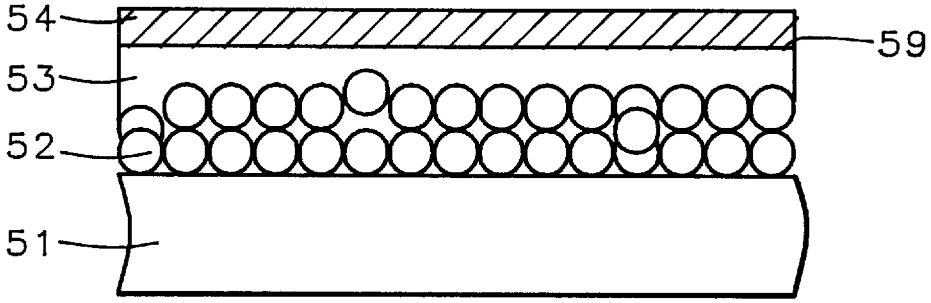

Referring now to FIG. 7, the next step is to deposit metallizing layer 54 onto planar surface 59. Typically, we have used aluminum as the material for layer 54 but other materials, such as gold, copper, titanium, or chromium could also have been used. The thickness of layer 54 is between about 1,500 and 2,500 Angstroms.

Figure 8:
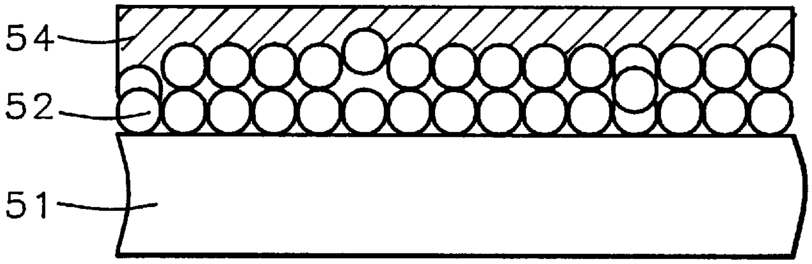

The final step in this second embodiment of our invention is a second heat treatment, typically at between about 450 and 550° C. for between about 60 and 180 minutes in air. This second heat treatment results in the structure seen in FIG. 8 where removal of dry film 53, has caused metal layer 54 to sink down into contact with phosphor layer 52 while still retaining a planar upper surface.

While the invention has been particularly shown and described with reference to the preferred embodiments thereof, it will be understood by those skilled in the art that various changes in form and details may be made without departing from the spirit and scope of the invention.

What is claimed is:

1. A method of manufacturing a metallized phosphor screen, comprising:

providing a substrate;

depositing a dry film on said substrate;

depositing a phosphor layer on said dry film;

subjecting the substrate, including the dry film and the phosphor layer, to a first heat treatment whereby the dry film is caused to reflow and acquire a planar surface that covers the phosphor layer;

depositing a metal layer onto said planar surface; and subjecting the substrate, including the dry film and the phosphor layer, to a second heat treatment, in an oxidizing atmosphere, thereby removing the dry film and causing the metal layer to contact the phosphor layer.

2. The method of claim 1 wherein the substrate is taken from the group consisting of soda lime glass, Corning 7059 glass and quartz.

3. The method of claim 1 wherein said second heat treatment further comprises heating at a temperature between about 450 and 550° C. for between about 60 and 180 minutes in air.

4. The method of claim 1 wherein depositing said dry film further comprises using a laminator or fixer.

5. The method of claim 1 wherein said phosphor layer comprises material taken from the group consisting of P45, P22, P15, and P53.

6. The method of claim 1 wherein the phosphor layer is deposited by screen printing or dusting.

7. The method of claim 1 wherein said dry film is deposited to a thickness that is between about 10 and 25 microns.

8. The method of claim 1 wherein the metal is alumnum, gold, copper, titanium, or chromium.

9. The method of claim 1 wherein the metal is deposited to a thickness that is between about 1,500 and 2,500 Angstroms.

10. The method of claim 1 wherein said first heat treatment further comprises heating at a temperature between about 100 and 200° C. for between about 10 and 20 minutes in air.

11. A method of manufacturing a metallized phosphor screen, comprising:

providing a substrate;

depositing a phosphor layer on said substrate;

depositing a dry film on said substrate;

subjecting the substrate, including the dry film and the phosphor layer, to a first heat treatment whereby the dry film is caused to reflow and acquire a planar surface;

depositing a metal layer onto said planar surface; and subjecting the substrate, including the dry film and the phosphor layer, to a second heat treatment, in an oxidizing atmosphere, thereby removing the dry film and causing the metal layer to contact the phosphor layer.

12. The method of claim 11 wherein the substrate is taken from the group consisting of soda lime glass, Corning 7059 glass and quartz.

13. The method of claim 11 wherein the metal is deposited to a thickness that is between about 1,500 and 2,500 Angstroms.

14. The method of claim 11 wherein said phosphor layer comprises material taken from the group consisting of P45, P22, P15, and P53.

15. The method of claim 11 wherein depositing said dry film further comprises using a laminator or fixer.

16. The method of claim 11 wherein the phosphor layer is deposited by screen printing or dusting.

17. The method of claim 11 wherein said dry film is deposited to a thickness that is between about 10 and 25 microns.

18. The method of claim 11 wherein the metal is aluminum, gold, copper, titanium, or chromium.

* * * * *